United States Patent
Gupta et al.

(10) Patent No.: US 9,331,852 B2
(45) Date of Patent: May 3, 2016

(54) SYSTEM AND METHOD FOR SECURING DATA TRANSACTION

(75) Inventors: Puneet Gupta, Bangalore (IN); Venkat Kumar Sivaramamurthy, Bangalore (IN); Akshay Darbari, Allahabad (IN); Sudhakar Vusirika, Bangalore (IN)

(73) Assignee: Infosys Technologies, Ltd., Bangalore (IN)

( * ) Notice: Subject to any disclaimer, the term of this patent is extended or adjusted under 35 U.S.C. 154(b) by 0 days.

(21) Appl. No.: 13/346,222

(22) Filed: Jan. 9, 2012

(65) Prior Publication Data

US 2012/0260089 A1    Oct. 11, 2012

(30) Foreign Application Priority Data

Apr. 7, 2011  (IN) ............... 1194/CHE/2011

(51) Int. Cl.
*H04L 9/00* (2006.01)
*H04L 9/08* (2006.01)

(52) U.S. Cl.
CPC ............ *H04L 9/0869* (2013.01); *H04L 9/0863* (2013.01); *H04L 2209/56* (2013.01)

(58) Field of Classification Search
None
See application file for complete search history.

(56) References Cited

U.S. PATENT DOCUMENTS

| | | | | |
|---|---|---|---|---|
| 7,373,509 B2 * | 5/2008 | Aissi et al. | ..................... | 713/168 |
| 7,577,250 B2 * | 8/2009 | Damgaard et al. | .............. | 380/44 |
| 7,607,015 B2 * | 10/2009 | Fascenda | ...................... | 713/171 |
| 7,684,565 B2 * | 3/2010 | Medvinsky | ..................... | 380/44 |
| 7,734,052 B2 * | 6/2010 | Braskich et al. | .............. | 380/277 |
| 7,813,503 B2 * | 10/2010 | Campagna et al. | ............. | 380/44 |

* cited by examiner

*Primary Examiner* — Minh Dinh
(74) *Attorney, Agent, or Firm* — LeClairRyan, a Professional Corporation

(57) ABSTRACT

A secure messaging channel is necessary especially when the message involves confidential transactions, for example a bank transaction which involves funds transfer and other additional information. The present disclosure describes securing message. The method of securing a message comprises providing a personal identification number by the user, wherein the personal identification number is associated to a unique number of a user. The unique number can be a mobile number. The correct personal identification number invokes the one-time password generator. The one time password generator accesses a metadata which comprises a value stored. The value stored in the metadata is retrieved to generate a dynamic key. The dynamic key is converted to a symmetric encryption key to encrypt the data. The dynamic key can also be converted to a symmetric decryption key to decrypt the data.

19 Claims, 4 Drawing Sheets

SYSTEM AND METHOD FOR SECURING DATA TRANSACTION

This application claims the benefit of Indian Patent Application Filing No. 1194/CHE/2011, filed Apr. 7, 2011, which is hereby incorporated by reference in its entirety.

TECHNICAL FIELD

The present disclosure relates to secure data transactions, and particularly, to a system and a method for securing a data transaction without exchanging keys between a server and a client.

BACKGROUND

Using textual messages to perform a secure mobile transaction(s) is a challenge today considering the various ways it could be exploited to gain credentials of a user by a nefarious hacker. The short message service (SMS) communication channel is not designed to carry a secured data. SMS transmission can also be affected by errors in the aggregator network and there are cases where the SMS meant for a particular user mobile number has been wrongly forwarded to another user's mobile number. To address such issues, in the prior art, there exist solutions that secure the SMS channel, that is, in particular secure mobile transactions. However, such methods of securing mobile transactions need secure keys to be exchanged between the server and the mobile device of the user. So, there is a need in the art to build a solution, which could establish mobile transactions securely without exchange of keys.

SUMMARY OF THE INVENTION

Aspects of the disclosure relate to a method and a system to secure a message without exchange of keys. The present disclosure describes methods that would provide increased level of security without exchange of keys.

According to the one aspect of the present disclosure, a method of securing mobile transactions includes providing a personal identification number. The personal identification can be manually entered by a user on a device. The personal identification number is associated with a unique number of the user. The unique number may be a mobile number of the user. The personal identification number invokes a one-time password generator, which is present on a client device. An application running on a device can be a downloadable application or a browser, wherein the browser may use scripts such as java scripts.

The one-time password generator accesses a metadata, which, for example, can be a seed file which contains a value. The value present in the metadata or the value along with the personal identification number can be used to generate a dynamic key. In accordance with various embodiments of the present invention, there are two copies of the metadata, one on the client side and the other at the server side. The user is identified by the same metadata both at the client side and the server side. The dynamic key is converted to a symmetric encryption key that can be used to encrypt a data that is being sent from the client side to the server side. The dynamic key may also be used to convert to a symmetric decryption key that can be used to decrypt the data being received from the client.

DRAWINGS

These and other features, aspects, and advantages of the present invention will be better understood when the following detailed description is read with reference to the accompanying drawings in which like characters represent like parts throughout the drawings, wherein.

DETAILED DESCRIPTION

Figure 1:
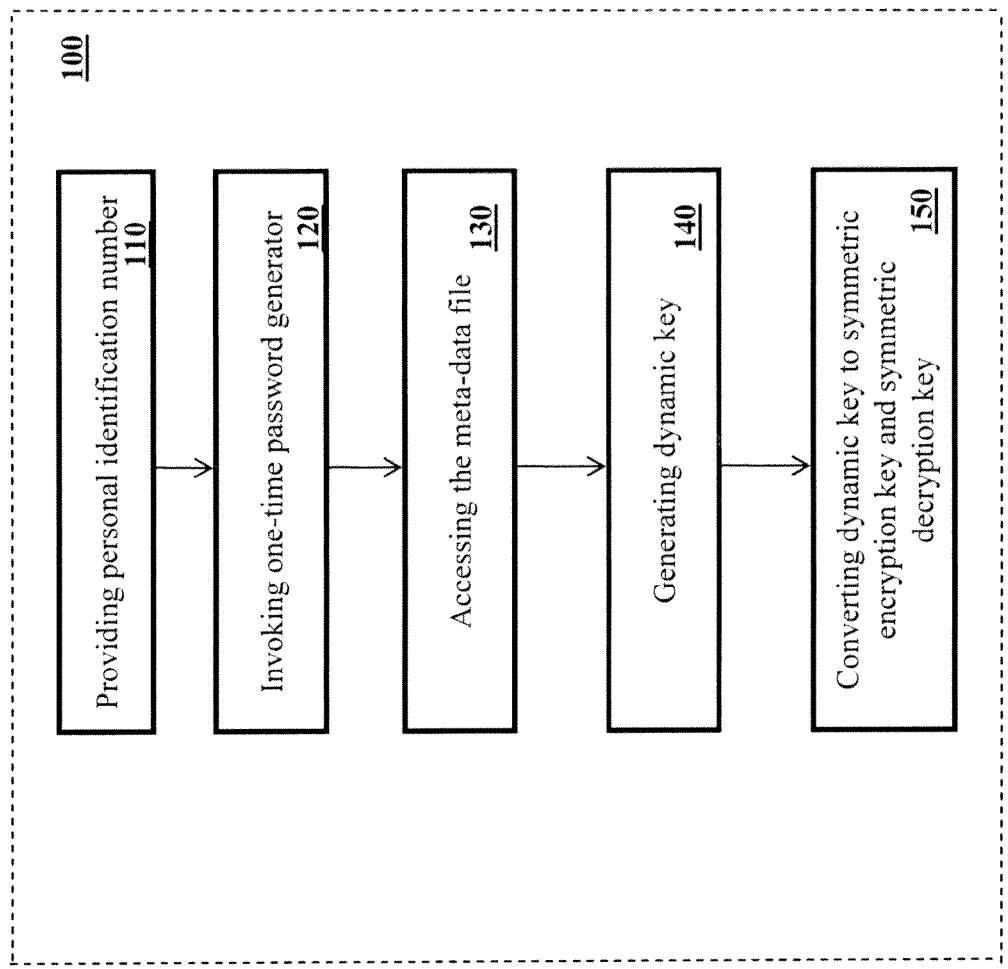
FIG. 1 is a flow chart illustrating a method 100 for securing a message, in accordance with an embodiment of the present invention.

The present disclosure proposes a method for securing an unsecured message. FIG. 1 is a flow chart illustrating a method 100 for securing a message, in accordance with an embodiment of the present invention. Method 100 describes the steps involved in a securing a mobile transaction without exchanging keys. Method 100 includes a step 110 wherein a user provides an input to the method on to a client device. In accordance with various embodiments of the present invention, the user provides a personal identification number (PIN) as an input. The PIN may be an alpha numeric value, which may also include special characters. Further, the PIN is associated with a unique number including, but not limited to, a mobile number, an internet protocol address, unique number assigned to an application and a medium access control number. In accordance with an embodiment, the user may also enter a username and a password along with the PIN as an input.

At step 120, a one-time password generator is invoked using the PIN. It should be noted that only the correct PIN invokes the one time password generator. The one-time password generator may be any one-time password generator known in the art.

At step 130, on entering of the correct PIN by the user, the metadata is accessed and the value present in the metadata is unlocked. The metadata may be a seed file that contains a value. In accordance with various embodiments, the value may include, but is not limited to, a counter value, a clock value and a clock pulse. Each user is identified by the metadata that is present both on a client side and the server side. It should be noted that the values present in the metadata, both on the client side and the server side, are synchronized. For example, the initial value may be set to zero. Subsequently, every time the value present in the metadata file is accessed, the values are incremented or decremented both on the client side and the server side simultaneously to keep the values synchronized.

At step 140, a dynamic key is generated by referring to the value or the value along with the personal identification number stored in the metadata file. In accordance with an embodiment, a new dynamic key is generated for every session during a transaction, in accordance with another embodiment; a new dynamic key is generated for every transaction between the server and the client. Further, every dynamic key generated may be stored and referred to at a later point in time.

At step 150, the dynamic key is converted to a symmetric encryption key at the client side to encrypt the data from the client side and send it to the server side. The data may include, but is not limited to, a short message service (SMS), a multimedia message and an email. Further, the symmetric encryption key may be in any of a 32-bit, a 64-bit, a 128-bit and a 256-bit or any other format. It should be noted that the symmetric encryption key by itself is not sent to the server; instead, the symmetric key is used to encrypt the data and the encrypted data is sent to the server. Hence, there is no exchange of the key between the client and the server. Further, when the encrypted data is received at the server side, the encrypted data is associated with a unique number from which it is sent. The PIN is retrieved from a user profile using the unique number. Further, the dynamic key is converted to a symmetric decryption key at the server side. The symmetric decryption key may be any of a 32-bit, a 64-bit, a 128-bit, and a 256-bit or any format.

Figure 2:
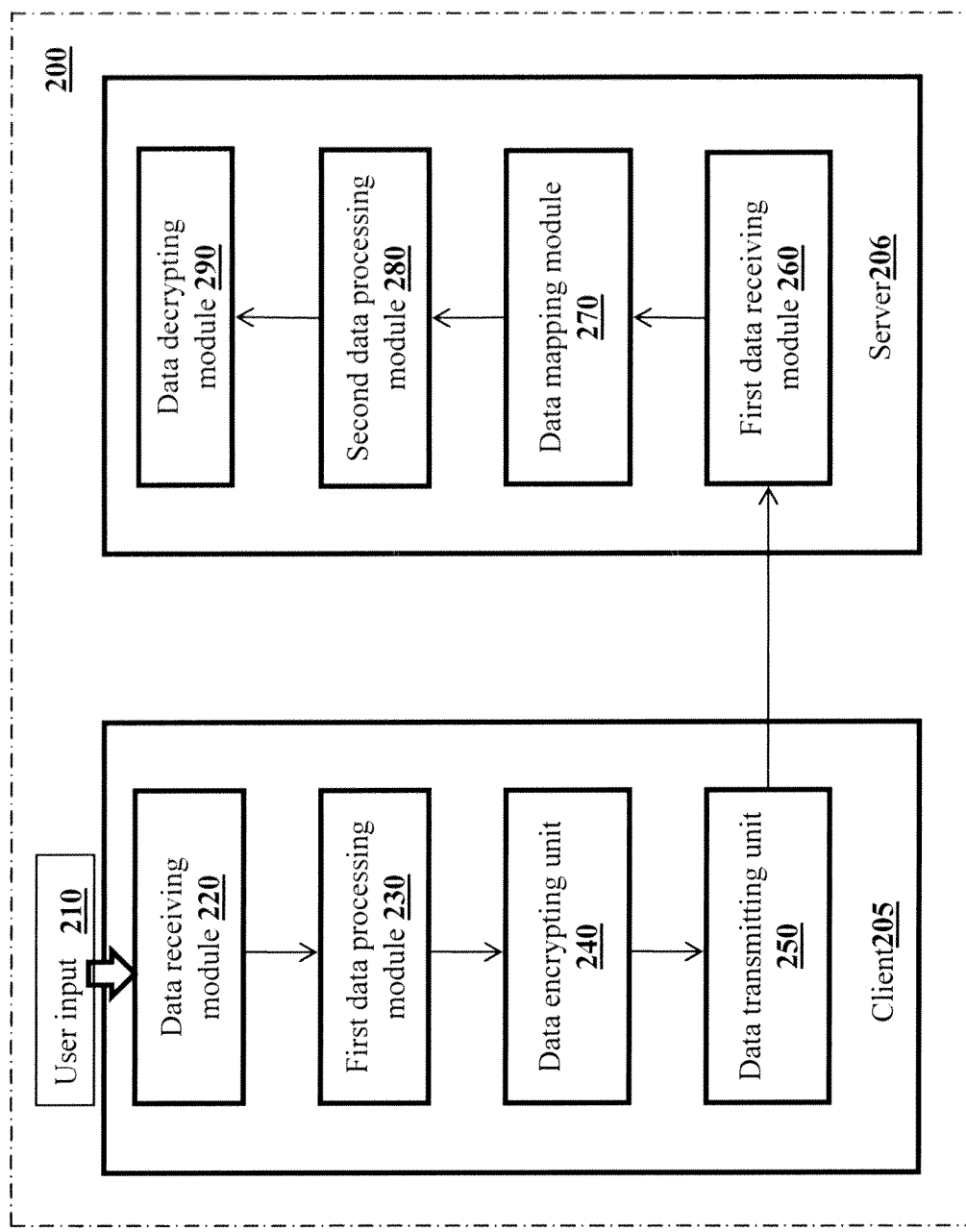
FIG. 2 is a block diagram illustrating a system 200 for securing a message, in accordance with an embodiment of the present invention.

FIG. 2 is a block diagram illustrating a system 200 for securing a message, in accordance with an embodiment of the present invention. System 200 includes a client 205 and a server 206. Client 205 includes a user input 210, a data receiving module 220, a first data processing module 230, a data encrypting module 240 and a data transmitting module 250. Server 206 includes a first data receiving module 260, a data mapping module 270, a second data processing module 280 and a data decrypting module 290. The user input 210 may be a personal identification number (PIN). The user input 210 may also include a username and a password entered along with the PIN on a client device.

The first data processing module 230 receives the input from the data receiving module 220. The data receiving module 220 includes a first one-time password generator (not indicated in the figure). In accordance with various embodiments, the first one time password generator is invoked when a correct PIN is entered. The first data processing module 230 further includes a seed file (not indicated in the figure) that stores a first instance of a value. The value may be any of a counter value, a clock value, and a clock pulse. Both client 205 and server 206 include a copy of the seed file. Further, the values present on client 205 and server 206 are synchronized. In accordance with an embodiment, the value present in the seed file is initialized to zero and the value is either incremented or decremented both on client 205 and server side 206 every time the seed file is accessed.

The first one time password generator accesses the seed file, and by referring to the first instance of the value, generates the first dynamic key. The first dynamic key is stored for that session, that is, until the user logs out. The first data processing module 230 may also be configured to store previously generated dynamic keys and the one time passwords generated. In accordance with an embodiment, the number of dynamic keys or one time passwords generated can be defined by a window size, which may be a numerical value. For example, if the value of the window size is specified as three, then the first data processing module 230 can store a maximum of three previously generated dynamic keys or one time passwords generated. The data encrypting module 240 converts the first dynamic key to a first symmetric encryption key. The first symmetric encryption key may be in any of a 32-bit, a 64-bit, a 128-bit, and a 256-bit or any format. The first symmetric encryption key is used to encrypt the data. The data may be a short message service (SMS), or an email or a multimedia message. The data transmitting unit 250 is configured to receive the encrypted data from the data encrypting module 240. The data transmitting unit 240 transmits the encrypted data to server 206 through an unsecured communication channel (not shown in the figure). The unsecured communication channel may be a wireless communication channel or a wired communication channel.

Further, the encrypted data is received at server 206 by the first data receiving module 260. The first data receiving module 260 is also configured to send the encrypted data to the data mapping module 270. The data mapping module 270 associates the encrypted message with a particular user profile by a unique number. In accordance with various embodiments, the unique number may be any of a mobile number, an internet protocol address and a medium access control number. By using the unique number, the data mapping module 270 retrieves the user profile information present in one of the service provider databases. The second data processing module 280 is configured to receive the user profile information from the data mapping module 270. The second data processing module 280 retrieves the PIN from the user profile information and the second one-time password generator which is invoked by the personal identification number. The second one time password generator accesses the seed file, refers to the second instance of the value stored in the seed file and generates a second dynamic key. The second dynamic key is stored for that session, that is, until the user logs out. The second data processing module 280 may also be configured to store previously generated dynamic keys and also the one time passwords generated. In accordance with an embodiment, the number of dynamic keys or one time passwords generated may be defined by a window size, which can be a numerical value. For example, if the value of the window size is three, then the second data processing module 280 can store a maximum of three previously generated dynamic keys or one time passwords generated.

In the embodiment of the present disclosure the first dynamic key on client 205 and the second dynamic key on server 206 are the same since they are synchronized. In other words, the first instance of the value stored on client 205 and the second instance of the value on server 206 are always synchronized and are identical. The data decrypting module 290 is configured to receive the second dynamic key and convert it to a first symmetric decryption key. The first symmetric decryption key may be any of a 32-bit key, a 64-bit key, a 128 bit key, and a 256-bit key. The first symmetric decryption key is used to decrypt the encrypted data. Decryption of the encrypted data is successful if the right user is identified and counters are synchronized. If the decryption fails, then server 206 retries with multiple keys generated by multiple one time passwords based on the window size set to identify any counter synchronization problems at server 206. Once the decryption is successful, the right counter value is set.

Figure 3:
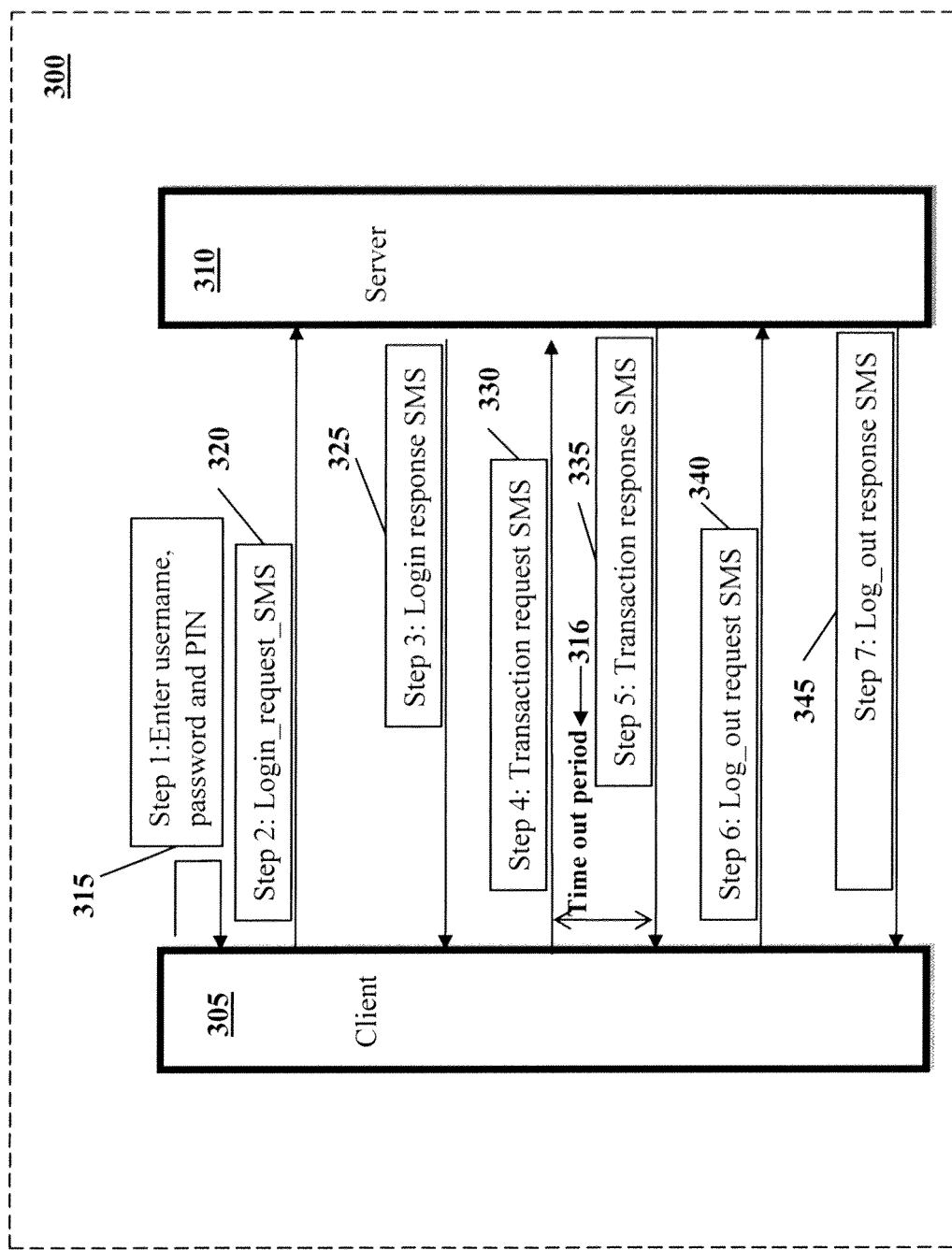
FIG. 3 is an example embodiment of the present disclosure.

The embodiment of the present disclosure can be further explained considering an example. FIG. 3 is an example embodiment of the present disclosure. At step 1 315, the user provides the username, password and the personal identification number (PIN), which is accepted by the data receiving module 220 (shown in FIG. 2) as an input to login page on the client device 305. The first data processing module 230 (shown in FIG. 2) is configured to accept input from step 315 and the correct PIN invokes the first one-time password generator present in the first data processing module 230.

At step 320, a login request is sent to the server 310. A first one time password generator accesses a seed file and retrieves the first instance of a value stored in the seed file to generate a first dynamic key. The first dynamic key is stored for that session, that is, until the user logs out. The first data processing module 230 may also be configured to store the previously generated dynamic keys and also the one time passwords generated. In accordance with an embodiment, the number of dynamic keys or one time passwords generated can be defined by a window size, which may be a numerical value. For example, if the value of the window size is three, then the second data processing module 280 can store a maximum of three previously generated dynamic keys or one time passwords generated. The data encrypting module 240 (shown in FIG. 2) converts the first dynamic key to a first symmetric encryption key, which preferably is a 128 bit encryption key. The username and password are encrypted using the first symmetric encryption key and the data transmitting unit 250 (shown in FIG. 2) sends the encrypted data to the server 310 using a short message service (SMS).

At step 325, the encrypted data is received from the client 305 followed by decryption of the data and sending of a response to the client 305. On receiving the encrypted data at the server 310, the first data receiving module 260 (shown in FIG. 2) receives the encrypted data and sends the data to the data mapping module 270 (shown in FIG. 2). The data mapping module 270 retrieves the PIN present in user profile information by mapping the unique number from which the encrypted data is sent. In this example, the unique number is the mobile number from which the encrypted data is sent. The data mapping module 270 retrieves the PIN from the user profile by mapping the corresponding mobile number of the user.

The second data processing module 280 (shown in FIG. 2) receives the PIN from the data mapping module 270 and invokes a second one-time password generator. The second one time password generator access a metadata file, which, in this example, is a seed file to retrieve the second instance of the value stored. A second dynamic key is generated by referring to the second instance of the value stored. The second dynamic key is stored for that session, that is, until the user logs out. The second data processing module 280 may also be configured to store the previously generated dynamic keys and also the one time passwords generated. In accordance with an embodiment, the number of dynamic keys or one time password generated can be defined by a window size, which may be a numerical value. For example, if the value of the window size is three, then the second data processing module 280 can store a maximum of three previously generated dynamic keys or one time passwords generated. The data decrypting module 290 (shown in FIG. 2) is configured to receive the second dynamic key from the second data processing module 280 and convert the second dynamic key to a first symmetric decryption key, which, in this example, is a 128-bit key. The first symmetric encryption key is used to decrypt the data. The encrypted username and password are extracted from the encrypted data and the login response 325 is sent to the client 305. If the username or password is typed wrongly then the server sends an appropriate error SMS. Decryption is successfully performed if the right user is identified and counter values in the seed file are synchronized. If decryption fails, then server 206 (shown in FIG. 2) retries with multiple keys generated by multiple one time passwords based on the window size set to identify any counter synchronization problems at the server 206 and the right counter value is set based on the successful decryption.

In the embodiment of the present disclosure step 2 320 occurs every time a message is being sent from the client 305 to the server 310.

Further, at step 4 330, the client 305 sends an SMS having a transaction request and waits for the server 310 to respond for a predefined period, for example, three minutes, which is described as time out period 316. The client 305 is not allowed to perform any new transactions within the time out period 316. In case of multipart SMS, if one or more pieces of the multipart SMS arrive after three minutes, an appropriate error message is displayed. Once client request SMS reaches the server 310, the transaction is carried out to completion and the response is sent to the client 305 at step 5 335. Further, if the response does not reach the client 305 within three minutes, the appropriate error message is displayed to the user and the user may carry out other transactions.

For further transactions, steps 4-6 are repeated and the same one time password generated on both client 305 and server 310, which is stored in the heap, will be used. This heap may be defined as a window size and the number of one time passwords generated can be modified by setting a limit of storing the one time passwords generated. On successful response to the client 305, the client 305 sends a log out request SMS to the server 310, which is indicated in step 6 340. The server 310 responds with a corresponding log out message to client 302 as indicated in step 7 345.

In accordance with an embodiment of the present invention, the server 310 stores the time at which it receives the SMS from the client 305, which is used along with the mobile number to maintain a session with the client 305.

In accordance with another embodiment of the present invention, a different dynamic key can be used for every transaction.

Further, in accordance with another embodiment of the present disclosure, a multi-part message can be sent to the server 310 in the following format.

| message Identifier | : | n/N | Reference value | Msg |
|---|---|---|---|---|

Where
msg: is a simple text representing start of message id part.
Message identifier: helps to associate the request and response
Reference value: helps to take decision on whether a new key or a old key needs to be used, key size, encryption or decryption algorithm.
n/N: is nth part of N parts.
Case 1: When all the pieces of multipart message arrive within 3 minutes, they are assembled and displayed on client 305.
Case 2: When one or more pieces of multipart message arrive after 3 minutes, appropriate error message is displayed on the client 305.

In another embodiment of the present disclosure, the first data processing module 230 on client 205 can use the context information such as type of network, condition of network, security rating of the network, profile of the user, handset profile etc to decide: use a new one time password by invoking the one time password generator or use the previous or old one time password; or a new encryption key can be generated using the one time password used in the previous step, and the selected key generation algorithm or an old encryption key can be used.

The data encrypting unit 240 can select the encryption algorithm based on the context information such as type of network, condition of network, security rating of the network, profile of the user, handset profile etc. and use the encryption key generated above to encrypt the message to be sent wherein a reference value is embedded in the message header. The reference value is chosen based on one or combination of the following: whether new password or old password; or key generation algorithm; or encryption algorithm and sends it to the server 206.

The second data processing module 280 uses the reference value to identify whether old key can be used or new key needs to be generated. If new key needs to be generated then the one time password generator module is used to generate the dynamic one time password using the identified personal identification number. The data decrypting module 290 uses the reference value, to select the right key generation algorithm and generates the decryption key of appropriate size from the dynamic one time password and decrypts the data.

Figure 4:
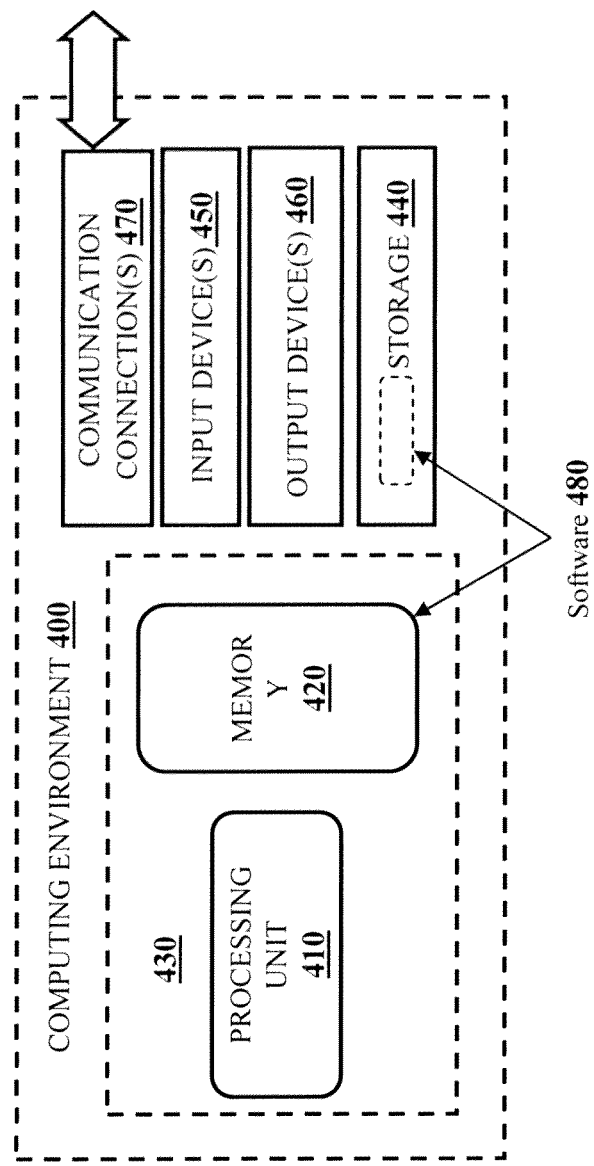
FIG. 4 is a system illustrating a generalized computer network arrangement, in accordance with an embodiment of the present invention.

One or more of the above-described techniques may be implemented in or involve one or more computer systems. FIG. 4 illustrates a generalized example of a computing environment 400. The computing environment 400 is not intended to suggest any limitation as to scope of use or functionality of described embodiments.

With reference to FIG. 4, the computing environment 400 includes at least one processing unit 410 and memory 420. In FIG. 4, this most basic configuration 430 is included within a dashed line. The processing unit 410 executes computer-executable instructions and may be a real or a virtual processor. In a multi-processing system, multiple processing units execute computer-executable instructions to increase processing power. The memory 420 may be volatile memory (e.g., registers, cache, RAM), non-volatile memory (e.g., ROM, EEPROM, flash memory, etc.), or some combination of the two. In some embodiments, the memory 420 stores software 480 implementing described techniques.

A computing environment may have additional features. For example, the computing environment 400 includes storage 440, one or more input devices 450, one or more output devices 460, and one or more communication connections 470. An interconnection mechanism (not shown) such as a bus, controller, or network interconnects the components of the computing environment 400. Typically, operating system software (not shown) provides an operating environment for other software executing in the computing environment 400, and coordinates activities of the components of the computing environment 400.

The storage 440 may be removable or non-removable, and includes magnetic disks, magnetic tapes or cassettes, CD-ROMs, CD-RWs, DVDs, or any other medium which may be used to store information and which may be accessed within the computing environment 400. In some embodiments, the storage 440 stores instructions for the software 480.

The input device(s) 450 may be a touch input device such as a keyboard, mouse, pen, trackball, touch screen, or game controller, a voice input device, a scanning device, a digital camera, or another device that provides input to the computing environment 400. The output device(s) 460 may be a display, a television, a hand held device, a head mounted display or a Kiosk that provides output from the computing environment 400.

The communication connection(s) 470 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations may be described in the general context of computer-readable media. Computer-readable media are any available media that may be accessed within a computing environment. By way of example, and not limitation, within the computing environment 400, computer-readable media include memory 420, storage 440, communication media, and combinations of any of the above.

Having described and illustrated the principles of our invention with reference to described embodiments, it will be recognized that the described embodiments may be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

In view of the many possible embodiments to which the principles of our invention may be applied, we claim as our invention all such embodiments as may come within the scope and spirit of the following claims and equivalents thereto.

What is claimed is:

1. A method comprising:
   retrieving, by a client computing device, in response to a current communication between the client computing device and a server and receipt of a correct personal identification number a current instance of a client-side seed value;
   generating, by the client computing device, a dynamic key based on the retrieved current instance of the client-side seed value;
   incrementing or decrementing, by the client computing device, the current instance of the client-side seed value to synchronize with a corresponding incrementing or decrementing at the server based on the current communication in response to the generating;
   converting, by the client computing device, the dynamic key to at least one or more of a symmetric encryption key or a symmetric decryption key, wherein the converting the dynamic key uses a key generation algorithm selected based on context information comprising a network security rating; and
   using, by the client computing device, the symmetric encryption key to encrypt data or the symmetric decryption key to decrypt the data related to the communication.

2. The method of claim 1 wherein the client computing device comprises:
   a mobile device,
   a handheld device,
   a kiosk, or
   a personal computer.

3. The method of claim 1 wherein the using the symmetric encryption key to encrypt the data further comprises, transmitting, by the client computing device, the encrypted data associated with a unique user number to a server.

4. The method of claim 1, wherein the converting further comprises session based converting of the first dynamic key to the first symmetric encryption key or time based converting of the first dynamic key to the first symmetric encryption key.

5. The method of claim 1 wherein the current instance of the client-side seed value further comprises:
   a counter value,
   a clock value, or
   a clock pulse.

6. The method of claim 1 wherein the personal identification number comprises:
   a mobile number,
   a unique number of an application,
   an internet protocol address, or
   a medium access control number.

7. The method of claim 1 wherein the data comprises:
   a short message service,
   a multimedia message service, or
   an email.

8. A client computing device comprising:
one or more processors;
a memory, wherein the memory is coupled to the one or more processors which are configured to be capable of executing programmed instructions comprising and stored in the memory to:
retrieve in response to a current communication between a client computing device and a server and receipt of a correct personal identification number a current instance of a client-side seed value;
generate a dynamic key based on the retrieved current instance of the client-side seed value;
increment or decrement the current instance of the client-side seed value to synchronize with a corresponding incrementing or decrementing at the server based on the current communication in response to the generating; and
convert the dynamic key to one or more of a symmetric encryption key or a symmetric decryption key, wherein the converting the dynamic key uses a key generation algorithm selected based on context information comprising a network security rating; and
use the symmetric encryption key to encrypt data or the symmetric decryption key to decrypt data related to the communication.

9. The device of claim 8 wherein the current instance of the client-side seed value comprises:
a counter value,
a clock, or
a clock pulse.

10. The device of claim 8, wherein the converting further comprises session based converting of the first dynamic key to the first symmetric encryption key or time based converting of the first dynamic key to the first symmetric encryption key.

11. The device of claim 8 wherein the processor is further configured to be capable of executing programmed instructions comprising and stored in the memory to:
store a set of previously generated dynamic keys based on a window size, wherein the window size is set to a numerical value.

12. The device of claim 8 wherein the processor is further configured to be capable of executing programmed instructions comprising and stored in the memory to:
insert a reference value into the encrypted data, wherein the reference value further describes a type of encryption algorithm used.

13. The device of claim 8 wherein the processor is further configured to be capable of executing programmed instructions comprising and stored in the memory to:
transmit the encrypted data or the decrypted data to the server.

14. A non-transitory computer readable medium having stored thereon instructions for securing a transaction comprising machine executable code which when executed by at least one processor, causes the processor to perform steps comprising:
retrieving in response to a current communication between a client computing device and a server and receipt of a correct personal identification number a current instance of a client-side seed value;
generating a dynamic key based on the retrieved current instance of the client-side seed value;
incrementing or decrementing the current instance of the client-side seed value to synchronize with a corresponding incrementing or decrementing at the server based on the current communication in response to the generating;
converting the dynamic key to at least one or more of a symmetric encryption key or a symmetric decryption key, wherein the converting the dynamic key uses a key generation algorithm selected based on context information comprising a network security rating; and
using the symmetric encryption key to encrypt the data or the symmetric decryption key to decrypt the data related to the communication.

15. The non-transitory computer readable medium of claim 14, further comprising receiving the personal identification number on the client computing device.

16. The non-transitory computer readable medium of claim 14, further having stored thereon instructions that when executed by the processor cause the processor to perform steps further comprising:
transmitting the encrypted data to the server.

17. The non-transitory computer readable medium of claim 14, further having stored thereon instructions that when executed by the processor cause the processor to perform steps further comprising:
associating the encrypted data with a user profile further comprising, retrieving the personal identification number.

18. The non-transitory computer readable medium of claim 14, wherein the converting further comprises session based converting of the first dynamic key to the first symmetric encryption key or time based converting of the first dynamic key to the first symmetric encryption key.

19. The non-transitory computer readable medium of claim 14, wherein the current instance of the client-side seed value further comprises a counter value, a clock value, or a clock pulse.

* * * * *